(12) United States Patent
Connolly et al.

(10) Patent No.: US 12,143,801 B2
(45) Date of Patent: *Nov. 12, 2024

(54) FILE FORMAT FOR SPATIAL AUDIO

(71) Applicant: Apple Inc., Cupertino, CA (US)

(72) Inventors: Matthew S. Connolly, San Jose, CA (US); Christopher T. Eubank, Santa Barbara, CA (US); Stephen E. Pinto, Mountain View, CA (US); Tomlinson Holman, Palm Springs, CA (US)

(73) Assignee: Apple Inc., Cupertino, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/666,868

(22) Filed: Feb. 8, 2022

(65) Prior Publication Data

US 2022/0167107 A1 May 26, 2022

Related U.S. Application Data

(63) Continuation of application No. 16/645,422, filed as application No. PCT/US2018/052717 on Sep. 25, 2018, now Pat. No. 11,272,308.

(Continued)

(51) Int. Cl.
*H04S 7/00* (2006.01)
*G06F 3/16* (2006.01)
(Continued)

(52) U.S. Cl.
CPC ............. *H04S 7/302* (2013.01); *G06F 3/165* (2013.01); *G10L 19/008* (2013.01);
(Continued)

(58) Field of Classification Search
CPC . H04S 7/302; H04S 7/00; G06F 3/165; G10L 19/08; G10L 19/167
See application file for complete search history.

(56) References Cited

U.S. PATENT DOCUMENTS 9,179,236 B2 11/2015 Robinson et al.
10,916,000 B2 2/2021 Van Der Vleuten et al.
(Continued)

FOREIGN PATENT DOCUMENTS

CN 1689332 A 10/2005
CN 105578380 A 5/2016
(Continued)

OTHER PUBLICATIONS

202111483443.7, "Chinese Patent Search Report", mailed Sep. 21, 2023, 3 pages.
(Continued)

*Primary Examiner* — Olisa Anwah
(74) *Attorney, Agent, or Firm* — Aikin & Gallant, LLP (57) ABSTRACT

An audio asset library containing audio assets formatted in accordance with a file format for spatial audio includes asset metadata that enables simulated reality (SR) application developers to compose sounds for use in SR applications. The audio assets are formatted to include audio data encoding a sound capable of being composed into a SR application along with asset metadata describing not only how the sound was encoded, but also how a listener in SR environment experiences the sound. A SR developer platform is configured so that developers can compose sound for SR objects using audio assets stored in the audio library, including editing the asset metadata to include transformation parameters that support dynamic transformation of the asset metadata in the SR environment to alter how the SR listener experiences the composed sound. Other embodiments are also described and claimed.

23 Claims, 5 Drawing Sheets

Related U.S. Application Data (60) Provisional application No. 62/566,094, filed on Sep. 29, 2017.

(51) Int. Cl.
  *G10L 19/008* (2013.01)
  *G10L 19/16* (2013.01)

(52) U.S. Cl.
  CPC ........ *G10L 19/167* (2013.01); *H04S 2400/15* (2013.01); *H04S 2420/11* (2013.01)

(56) References Cited

U.S. PATENT DOCUMENTS

| | | |
|---|---|---|
| 2002/0116533 A1 | 8/2002 | Holliman et al. |
| 2006/0020474 A1 | 1/2006 | Stewart et al. |
| 2014/0176604 A1 | 6/2014 | Venkitaraman et al. |
| 2014/0233917 A1 | 8/2014 | Xiang |
| 2016/0212272 A1 | 7/2016 | Srinivasan et al. |
| 2016/0266865 A1* | 9/2016 | Tsingos .................. G06F 3/162 |
| 2017/0140160 A1 | 5/2017 | Arasan et al. |
| 2018/0036639 A1* | 2/2018 | Reid ...................... A63F 13/52 |
| 2019/0253826 A1* | 8/2019 | Grosche .................. H04R 3/12 |

FOREIGN PATENT DOCUMENTS

| | | |
|---|---|---|
| CN | 105684467 A | 6/2016 |
| WO | 2013192111 A1 | 12/2013 |
| WO | 2016050298 A1 | 4/2016 |

OTHER PUBLICATIONS

Herre et al., "MPEG-H 3D Audio—The New Standard for Coding of immersice Spatial Audio", received from https://ieeexplore.ieee.org/document/7056445, Mar. 9, 2015, 10 pages.

"The China National Intellectual Property Administration Patent Search report", mailed Jan. 30, 2024, 2 pages.

* cited by examiner

FILE FORMAT FOR SPATIAL AUDIO

This is a continuation of U.S. patent application Ser. No. 16/645,422 filed Mar. 6, 2020, which is a 371 National Stage Entry of International Application No. PCT/US2018/052717 filed Sep. 25, 2018, which claims the benefit of the earlier filing date of U.S. provisional application No. 62/566,094 filed Sep. 29, 2017.

TECHNICAL FIELD

The technical field relates generally to computerized data processing systems and methods for audio processing, and in particular to spatial audio processing in a simulated reality environment.

BACKGROUND

Producing three-dimensional (3D) sound effects in augmented reality (AR), virtual reality (VR), and mixed reality (MR) applications, all of which in this disclosure are encompassed by the term simulated reality (SR), is challenging because existing audio formats were originally designed for producing 3D sound in a physical environment with fixed speaker locations and stationary listeners, such as in a movie theater. Examples of spatial audio formats designed to produce 3D sound include MPEG-H (Moving Picture Experts Group) 3D Audio standards, HOA (Higher-order Ambisonics) spatial audio techniques, and DOLBY ATMOS surround sound technology.

One alternative for producing 3D sound effects in SR environments is to manipulate individual discrete sounds contained in audio objects that can be virtually located anywhere in the 3D environment. Composing audio for SR applications using existing spatial audio formats and objects is difficult since there is no uniform way to access a variety of sound sources and incorporate them into a dynamic SR environment.

SUMMARY OF THE DESCRIPTION

Embodiments of a file format for spatial audio as herein described enable augmented SR application developers to compose sounds for use in SR applications in which the audio data that is encoding a sound capable of being composed into a SR application is stored as an audio asset including asset metadata describing not only how the sound was encoded but also how a listener in a SR environment that has spatial audio rendering capability experiences the sound.

The SR developer can retrieve the audio asset during development, preview how the listener would experience the sound during playback, attach the audio asset to a SR object associated with experiencing the sound in the SR environment, and edit the asset metadata until the desired 3D sound effects that affect how the listener experiences the sound are achieved.

In one embodiment, audio assets are created and stored in an audio asset library from which the audio asset can be retrieved for composing into the SR application. The composition of the application may encompass attaching the audio asset to the SR object associated with experiencing the sound in the SR environment.

In one embodiment, how the listener experiences the sound in the SR environment depends upon how 3D sound, also referred to as spatial sound, is simulated in a sound playback system, including sounds systems that use binaural rendering (e.g., through headphones), rendering for a loudspeaker-only based playback system, or rendering for a combination headphone-loudspeaker system. Embodiments of the file format for spatial audio described here support a variety of sound sources and audio encodings for reproducing sound to simulate spatial audio in sound playback systems, including single listener playback systems using binaural rendering.

In accordance with embodiments of the file format for spatial audio, an audio asset is stored in an audio library, wherein the audio asset contains audio data encoding the sounds represented by the audio data, including any one or more of the following: a monaural recording of an individual sound; a multi-channel recording of a sound environment including any one of a recording produced using an array of microphones, a recorded mix of multiple sound sources including a mix of multiple discrete sounds recorded using one or more microphones, or a recording that preserves spatial characteristics of recorded sound; and synthesized audio data for producing one or more sounds.

To accommodate audio data representing the different types of sound sources from which the sounds were captured, an audio asset stored in an audio library in accordance with embodiments of the file format for spatial audio includes asset metadata that describes how to decode the audio data (that is encoding the sound for experience by the listener), including global metadata for the audio asset and channel metadata for any one or more channels of the audio asset.

In accordance with embodiments of the file format for spatial audio, the asset metadata describes how to decode the audio data (encoding the sound for experience by the listener) based on a plurality of characteristics associated with how the sound was captured or how it was created (e.g., a synthesized sound that was not recorded with a microphone), including any one or more of a location of the sound, including a discrete location of the sound or a location encoded using the aforementioned Higher Order Ambisonics (HOA) format, whether or not the sound is directional, e.g., a specified directivity of the sound per channel of audio data, the directivity (if specified) representing any one of a shape or a mathematical function used to convey directional characteristics of the sound, an orientation of the sound, including an orientation per channel of audio data, an original sound pressure level (SPL) of the sound, including a distance at which the SPL was captured, a size or shape of the sound expressed as a polygonal mesh that may have a 3D spatial volume or volumetric size or shape, and a playback rate for the sound, including a global playback rate for all channels of audio data. With regard to the directional characteristic, the shape includes but is not limited to a sphere, semi-sphere, or cone, and the mathematical functions include but are not limited to a unit-sphere or cardioid polar response.

In one embodiment, the plurality of characteristics associated with how the sound was encoded in the audio data includes a description of any one or more recording systems used to capture the sound, including an array of microphones.

Because composing sound for use in a SR environment often requires altering the sound to accommodate a non-stationary listener or a non-stationary SR object associated with experiencing the sound in the SR environment, embodiments of the file format for spatial audio allows SR application developers to edit the asset metadata of an audio asset attached to a SR object to accept any one or more of a plurality of transformation parameters that enable dynamic transformation of the asset metadata in the SR application to alter how the listener experiences the sound in the SR environment.

In accordance with embodiments of the file format for spatial audio, the plurality of transformation parameters that enable dynamic transformation of the asset metadata include a relationship parameter for dynamically transforming how the listener in the SR environment experiences the sound based on a relationship between the listener and a SR object to which the audio asset is attached, the relationship including any one of a location and orientation of the listener relative to the SR object, which affects how the listener experiences the sound in the SR environment.

In accordance with embodiments of the file format for spatial audio, the transformation parameter alters how the listener experiences the sound in the SR environment by dynamically transforming the asset metadata before decoding the audio data for experience by the listener. For example, the relationship between the listener and the SR object as determined in the SR environment is used to set the relationship transformation parameter for dynamically transforming the asset metadata before decoding the audio data which, in turn, dynamically alters how the listener experiences the sound in the SR environment.

In accordance with embodiments of the file format for spatial audio, responsive to a request from a SR developer or as a result of using an audio asset in the SR environment, an audio asset stored in the audio library is edited to add metadata describing how the audio asset was used in the SR environment, including identifying the SR object to which the audio asset was attached. In this manner, a historical record of use of the audio asset in any one or more SR applications is maintained in the audio library which can be useful for a developer to know where the sound of the audio asset was previously used.

The various systems, apparatuses and methods described herein can be performed by one or more data processing systems to create and use an audio library for composing sound in a SR environment in accordance with embodiments of a file format for spatial audio. This audio library may be shared over a network. In some instance, the audio library may be a database that is accessible through collaborative software.

The methods and systems described herein can be implemented by data processing systems, such as server computers, desktop computers and other data processing systems and other consumer electronic devices. The methods and systems described herein can also be implemented by one or more data processing systems which execute executable computer program instructions, stored in one or more non-transitory machine readable media that cause the one or more data processing systems to perform the one or more methods described herein when the program instructions are executed. Thus, the embodiments described herein can include methods, data processing systems, and non-transitory machine-readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Physical Setting

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

Simulated Reality

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

Virtual Reality

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Mixed Reality

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

Augmented Reality

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Augmented Virtuality

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Hardware

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 1:
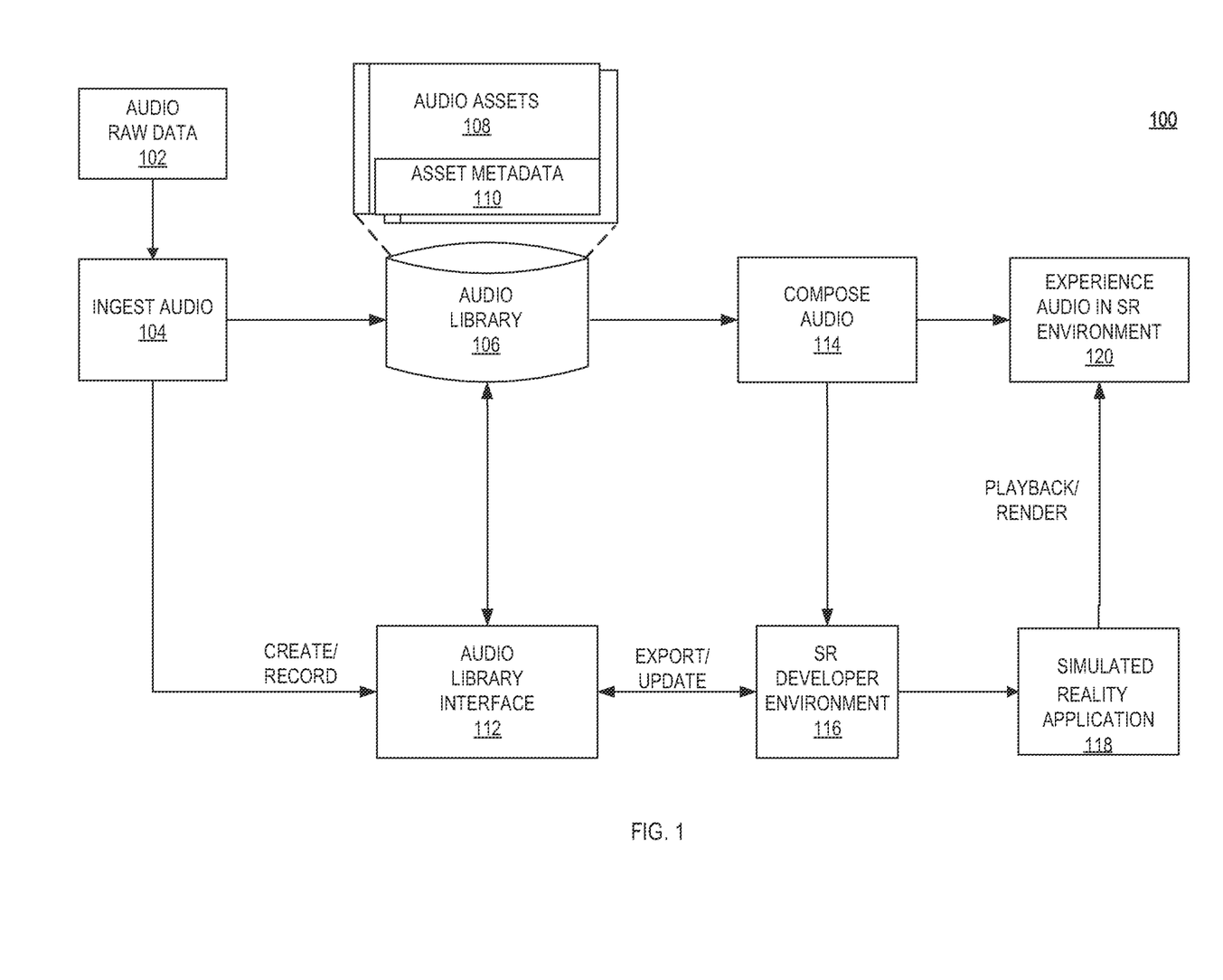
FIG. 1 is a block diagram illustrating an overview of an audio asset library for use in composing sound for SR environments in accordance with one or more embodiments described herein.

FIG. 1 illustrates an overview 100 of an audio asset library 106 for use in composing sound 114 for experience in SR environments 120. An ingest audio process 104 accepts a variety of raw audio data 102 to create and record an audio asset 108 for storing in the audio asset library 106. An audio library interface 112 facilitates the creation of the audio assets 108, including the creation (at ingestion) of some asset metadata 110 describing not only how sound is encoded in the audio asset (e.g., how the raw audio data 102 was recorded or generated) but also how the audio asset is to be rendered to provide a desired experience to a listener in a SR environment. In some instances, there may be some asset metadata 110 that already exists at the time of ingestion, and such pre-existing asset metadata 110 may be imported into the audio asset 108.

In one embodiment, a SR developer platform 116 is configured to retrieve audio assets 108 from the audio library 106 and perform a composition using an audio asset process 114 that enables the SR developer to export the audio asset to a SR application 118 for experience in the SR environment 120. In one embodiment, the composition audio process 114 modifies the asset metadata 110, and the audio asset is decoded during playback, for experience in the SR environment 120, using the asset metadata 110 as modified. The asset metadata 110 of a given audio asset 108 can also be dynamically transformed during such playback as described further below.

Figure 2:
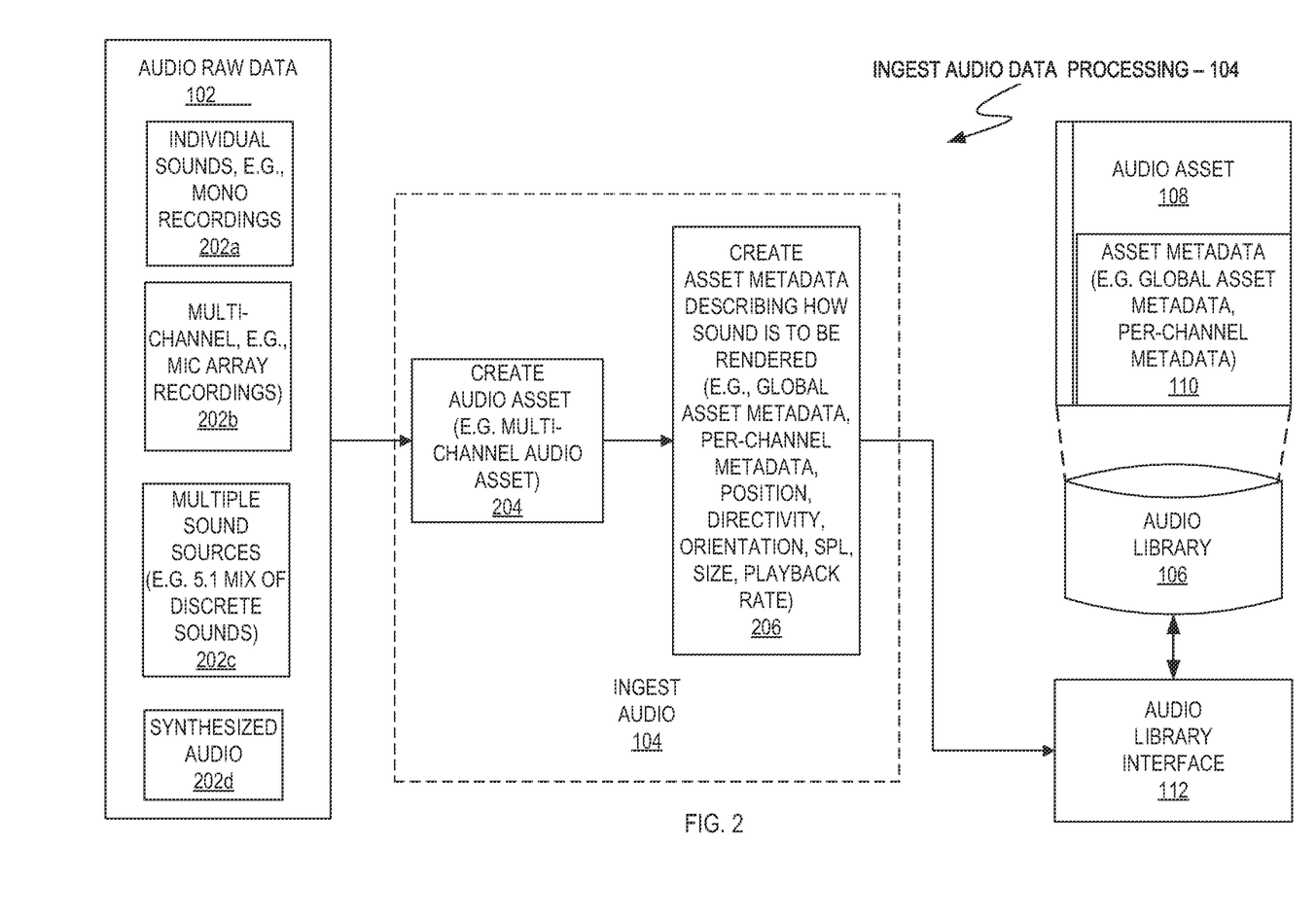
FIG. 2 is a block diagram illustrating further details of the audio asset library for use in composing sound for SR environments in accordance with one or more embodiments described herein.

FIG. 2 illustrates the ingest audio process 104 of FIG. 1 in further detail in accordance with embodiments of a file format for spatial audio as described herein. The ingest audio process 104 may have a create audio asset process 204 and a create asset metadata process 206. The raw audio data 102 from which the audio assets 108 are created in the create audio asset process 204 can include any recording that preserves spatial characteristics of sound, such as HOA encoded sounds, individual sounds such as monaural recordings 202a, multi-channel sounds such as microphone array recordings 202b, multiple mixed sound sources such as a 5.1 mix of discrete sounds 202c, and synthesized audio 202d. The create audio process 204 may re-package or re-encode the raw audio data 102 into a different format. At process 206, the ingest audio process 104 creates asset metadata (or imports preexisting metadata) that describes how the sound is encoded in the audio asset (e.g., how the raw audio data 102 was recorded or generated) and how the audio asset is to be decoded for rendering to a sound playback system.

In one embodiment, the created asset metadata includes global asset metadata that describes on an asset-level how the asset is to be decoded for rendering to a sound playback system. In one embodiment, the created asset metadata includes asset channel metadata that describes on a per-channel basis how the asset is to be decoded for rendering to a sound playback system for multi-channel audio data contained in the audio asset. The created asset metadata may include other characteristics of the asset that describe how the raw audio was recorded or generated and how the asset is to be decoded for rendering, including the location, directivity and orientation, a sound pressure level, including a distance at which the sound pressure level was captured, a size of the sound expressed as a 3D spatial volume or volumetric size, and a playback rate, including a global playback rate for all channels of audio data representing the sound. In one embodiment, the ingest audio process 104 concludes with storing the audio asset 108 (including the associated asset metadata 110) as a library item in the audio asset library 106.

Figure 3:
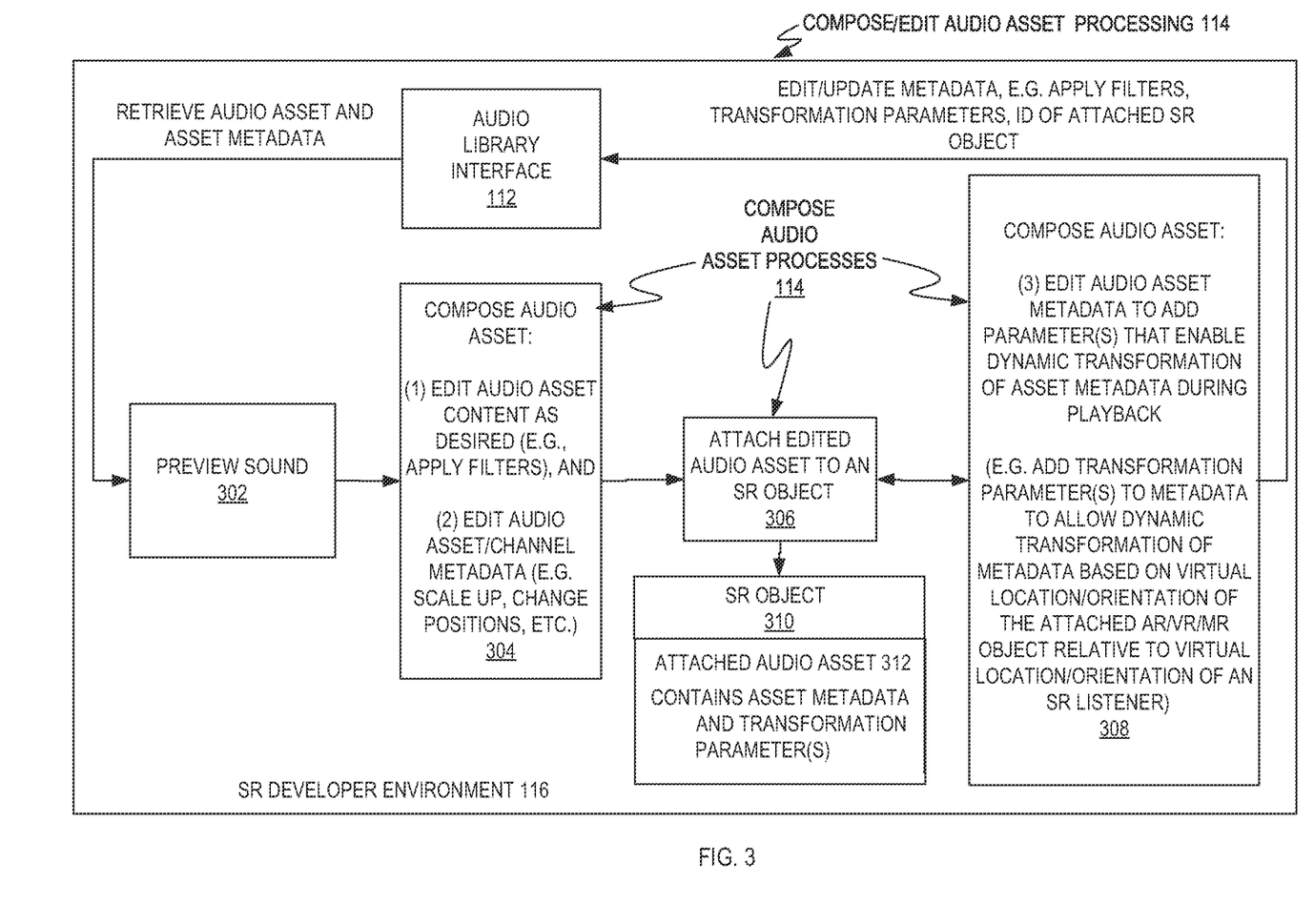
FIG. 3 is a block diagram illustrating further details of the audio asset library for use in composing sound for SR environments in accordance with one or more embodiments described herein.

FIG. 3 illustrates an example of the composition audio process 114 introduced in FIG. 1 in further detail in accordance with embodiments of a file format for spatial audio as described herein. In a SR developer platform configured to compose sound using the audio library 106 in accordance with an embodiment of the file format for spatial audio, a preview sound process 302 retrieves an audio asset 108 and enables the SR developer to preview how a SR listener would experience sound produced from the audio asset 108 using the asset metadata 110. A compose audio asset process 304 facilitates editing the audio asset 108 content as desired, such as by applying digital filters to the sound generated from decoded audio data, and then re-encoding the filtered sound (thereby including the result of the filters) into the audio asset 108, or by modifying the asset metadata to describe the filters so that they can be applied at a later time. The composition audio asset process 114 also facilitates editing the asset metadata directly, including appending additional metadata, scaling up the metadata, changing the location of the sound described in the asset metadata, and so forth.

In a SR developer platform configured to compose sound using the audio library 106 in accordance with an embodiment of the file format for spatial audio, an attach process 306 may be configured to attach the composed/edited audio asset to a SR object 310 in the SR application—referred to here as an attached audio asset 312. An additional compose audio asset process 308 may be configured to further edit the audio asset metadata 110 of the attached asset 312 to add one or more transformation parameters that will enable "dynamic" transformation of the audio asset metadata 110. For example, the transformation parameters may transform or change the asset metadata 110 during subsequent playback in the AR/VR environment where the latter is created during operation or execution of the AR/VR application. As will be described below with reference to the experience/playback sound processing in FIG. 4, the transformation parameters facilitate dynamic transformation of audio asset metadata 110 based on, among other determinations made in the SR environment created during operation of the SR application, a determination of the virtual location and/or orientation of the SR object (to which the audio asset 108 was attached) relative to the virtual location and/or orientation of the SR listener.

Figure 4:
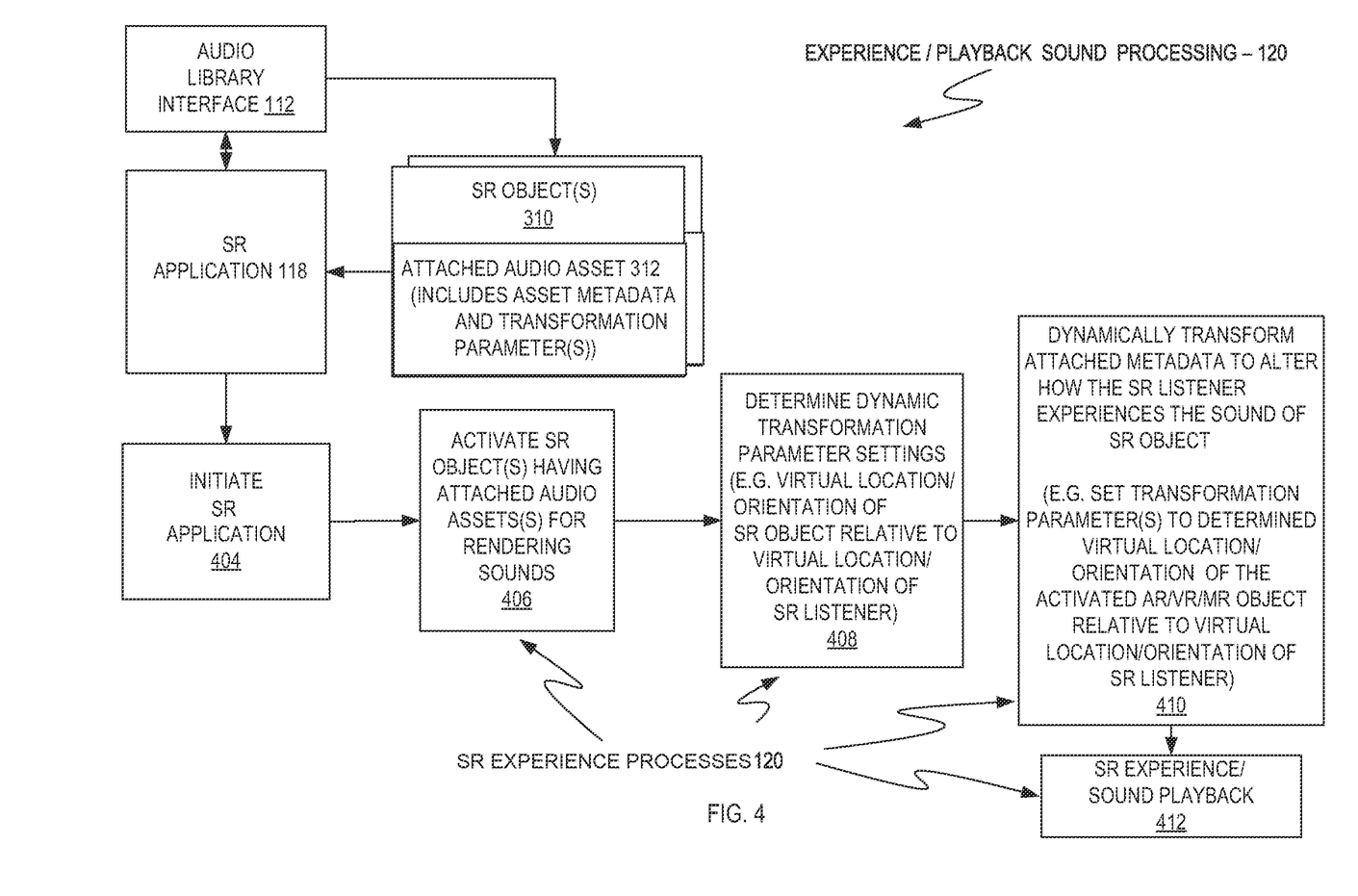
FIG. 4 is a block diagram illustrating further details of the audio asset library for use in composing sound for SR environments in accordance with one or more embodiments described herein.

FIG. 4 illustrates the experience/playback sound process 120 introduced in FIG. 1 in further detail in accordance with embodiments of a file format for spatial audio as described herein. As previously described with reference to FIG. 3, a SR application 118 includes sound (composed for SR objects 310) contained in attached audio assets (that contain asset metadata and any transformation parameters that were added during the additional compose audio asset process 308.)

In one embodiment, when a SR application is initiated 404 in the SR environment 120 and one of the SR objects 310 that have attached audio assets 312 is activated 406, a process 408 is triggered to determine settings for dynamic transformation parameters in the metadata of the attached audio asset 312, if any, for the activated SR object 310. At process 410, the SR environment 120 created by the SR application 118 dynamically transforms elements in the metadata of the attached audio asset 312 using the determined settings, prior to or during playback. For example, the settings of a transformation parameter representing a relationship between the SR object 310 and a SR listener in the SR environment can be determined based on a virtual location and/or orientation of the SR object 310 relative to a virtual location and/or orientation of a SR listener. Examples of elements in the metadata that can be exposed as transformable in the asset 312 (can be transformed by the dynamic transformation parameters) include (but are not limited to): an audio level of an audio signal in the asset 312, as a sound power level or sound pressure level (which may be measured under specific conditions); equalization (filtering or spectral shaping) of the audio signal; and distance compensation of the audio signal to achieve a response due to atmospheric or other transmission losses. More generally, the elements that can be exposed in the asset 312 as transformable may range from low level audio digital signal processing (DSP) controls to high level "color" controls that the asset 312 translates into low level audio DSP controls.

Upon determining the settings for any dynamic transformation parameters of the metadata of the attached audio asset 312, the experience/playback sound process 120 creates the SR experience 412, altering how the SR listener experiences the sound, by decoding the sound using the now dynamically transformed metadata of the audio asset 312. In one embodiment, the processes 408, 410 for determining the transformation parameter settings and transforming the metadata of an attached audio asset 312 of a SR object 310 are performed repeatedly during execution of the SR application to provide the SR listener with the SR experience as composed by the SR developer of the SR application.

Figure 5:
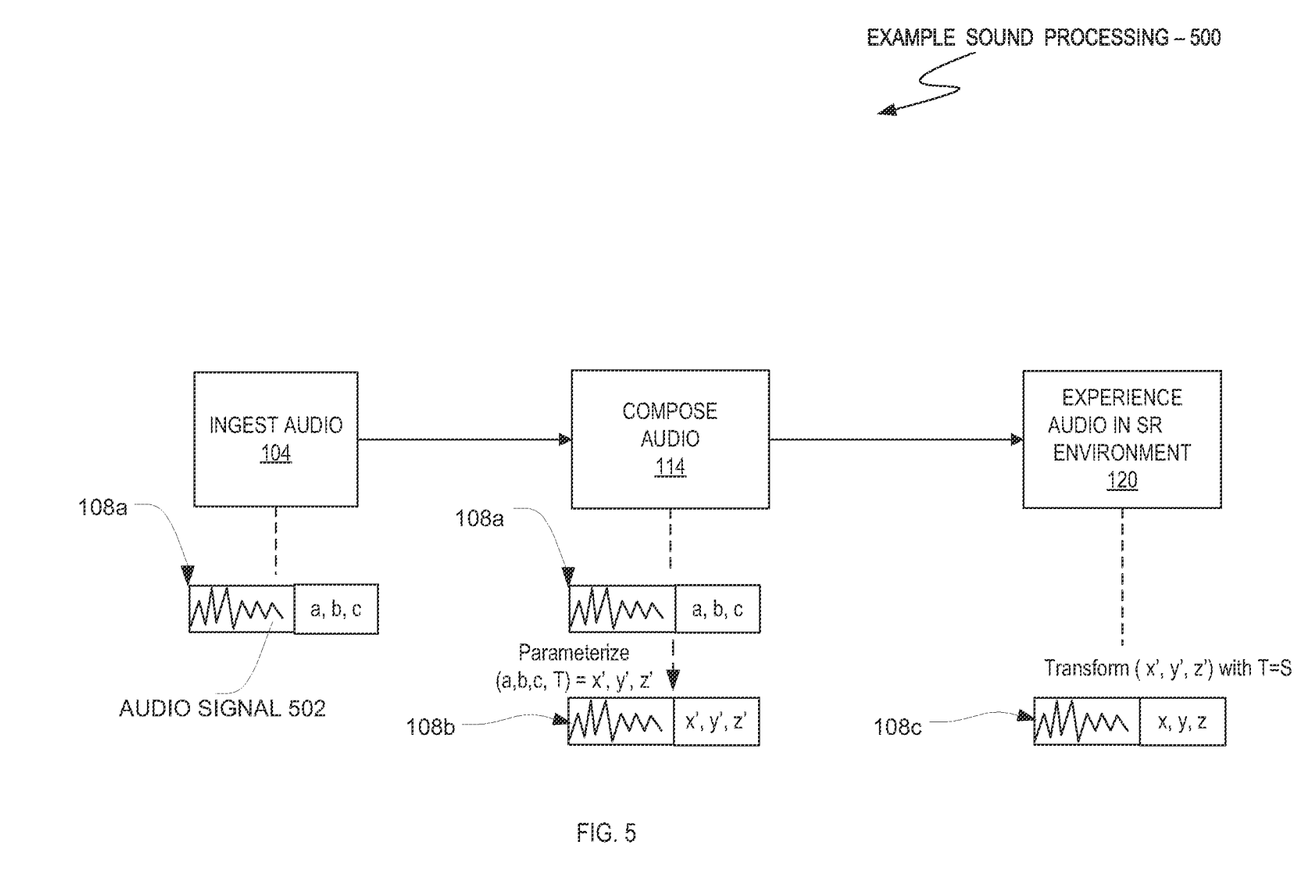
FIG. 5 is an illustration of an exemplary ingestion, composition and experience of sound processing of audio assets in accordance with one or more embodiments described herein.

FIG. 5 is an illustration of an exemplary ingestion, composition and experience of sound processing of audio assets in accordance with one or more embodiments described herein. As shown, an audio signal 502 encoded in an audio asset 108a during the ingest audio process 104 is associated with metadata "a, b, c". During the compose audio process 114, the metadata a, b, c is parameterized with a parameter T into metadata "x', y', z'" resulting in edited audio asset 108b (in which the audio signal 502 may remain unchanged while the metadata is altered or transformed, for creating the SR experience 120). To create the SR experience 120, the parameterized metadata "x', y', z'" of audio asset 108b is dynamically transformed into metadata "x, y, z" by setting parameter T to setting S as determined in the SR environment 120, where setting S is, for example, the location/orientation of the SR object to which the audio asset 108b is attached relative to the SR listener for whom the SR experience is being created. Other examples of elements in the metadata that can be transformed include those given above, where in general the elements that can be exposed in the asset 312 as transformable may range from low level audio DSP controls to high level "color" controls that the asset 312 translates into low level audio DSP controls. Using the transformed metadata "x, y, z" the SR environment 120 creates the experience of audio asset 108c for the SR listener.

In one embodiment, a request is received from an SR application to edit an audio asset to add metadata describing how the audio asset was used in the SR application, e.g., identifying the SR object to which the audio asset was attached; the audio asset is edited according to the received request, to produce an edited audio asset; and the edited audio asset is published to the audio library, e.g., as a new audio asset.

In accordance with another embodiment, when an application uses a particular sound asset from their library, it's also useful to know where or how the asset was used, independently of publishing a new asset to the library. For instance, when a new asset is created, publishing it to the library is useful and may be performed as described above. If that asset is used again by an SR application, it's useful to know where it was used; in that instance it may not be necessary to republish the asset again for that second case. Rather, the process in that case may be as follows: a request is received from the SR application to edit an audio asset to add metadata describing how (e.g., where) the audio asset was used in the SR application, including for example identifying the SR object to which the audio asset was attached; the metadata of the audio asset is then edited according to the received request; and the edited metadata (not necessarily the entire asset) is published to the audio library The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include server systems, desktop computers, laptop computers, embedded electronic devices, or consumer electronic devices.

It will be apparent from this description that aspects of the present invention may be embodied, at least in part, in software. That is, the techniques may be carried out in a data processing system by its processor executing a sequence of instructions contained in a storage medium, such as a non-transitory machine-readable storage medium (e.g. DRAM or flash memory). Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

To aid the Patent Office and any readers of any patent issued on this application in interpreting the claims appended hereto, applicant wishes to note that they do not intend any of the appended claims or claim elements to invoke 35 U.S.C. 112(f) unless the words "means for" or "step for" are explicitly used in the particular claim.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A memory for storing data for access by an application program, the memory comprising:
   a simulated reality application (an SR application) stored in the memory; and
   a data structure stored in the memory, the data structure including an audio asset, wherein the audio asset comprises audio data and asset metadata, the audio data having therein a sound encoded in accordance with or as specified in the asset metadata, the asset metadata configures the SR application when executed by a computer for composing sound for an SR environment, as the audio asset is rendered in the SR application;

the asset metadata includes a relationship parameter representing a relationship between a listener in the SR environment and a SR object to which the audio asset is attached, and wherein the SR application dynamically transforms the asset metadata by editing the relationship parameter which alters how the audio asset is rendered in the SR application executed by the computer.

2. The memory of claim 1 wherein the data structure further comprises an audio library stored in the memory, the audio asset being in the audio library.

3. The memory of claim 1, wherein the asset metadata describes how the audio asset is rendered in the SR application by describing how spatial sound is simulated in a sound playback system using binaural rendering.

4. The memory of claim 3 wherein the relationship parameter in the asset metadata represents any one of a location and orientation of the listener relative to the SR object as determined in the SR environment.

5. The memory of claim 4 wherein the dynamic transformation of the asset metadata is based on a characteristic of a further SR object in the SR application, wherein the characteristic of the further SR object includes any one of a location of the further SR object, an orientation of the further SR object, or a velocity of the further SR object.

6. The memory of claim 1 wherein the audio data includes any one or more of:
   a monaural recording of an individual sound;
   a multi-channel recording of a sound environment, including any one of a recording produced using an array of microphones, a recorded mix of multiple sound sources including a mix multiple discrete sounds, and a recording that preserves spatial characteristics of recorded sound; and
   synthesized audio data for producing one or more sounds.

7. The memory of claim 1, wherein the asset metadata comprises:
   global metadata for the audio asset; and
   channel metadata for any one or more channels of the audio asset.

8. The memory of claim 1, wherein the asset metadata describing how the sound was encoded describes one or more characteristics associated with how the sound was captured.

9. The memory of claim 8 wherein the asset metadata describing how to render the audio asset comprises one or more of:
   a location of the sound, including a discrete location or a location encoded using a higher order ambisonics (HOA) format;
   a directional characteristic of the sound per channel of audio data, the directional characteristic representing any one of a shape and a mathematical function used to convey directionality of the sound the shape including any one of a sphere, semi-sphere or cone, the mathematical function including any one of unit-sphere or cardioid polar response or a look up table that defines an arbitrary directivity;
   an orientation of the sound, including an orientation per channel of audio data;
   a sound pressure level (SPL) or a sound power level of the sound, and a distance at which the SPL or sound power level was captured;
   a size or shape of the sound expressed as a polygonal mesh or a volumetric size; and
   a playback rate for the sound, including a global playback rate for all channels of audio data.

10. The memory of claim 9, wherein the one or more characteristics associated with how the sound was captured comprises a description of one or more recording systems used to capture the sound.

11. The memory of claim 10 wherein the description of one or more recording systems used to capture the sound comprises a description of a microphone array.

12. The memory of claim 1 wherein the asset metadata describing how to render the audio asset comprises one or more of:
   a location of the sound, including a discrete location or a location encoded using a higher order ambisonics (HOA) format;
   a directional characteristic of the sound per channel of audio data, the directional characteristic representing any one of a shape and a mathematical function used to convey directionality of the sound the shape including any one of a sphere, semi-sphere or cone, the mathematical function including any one of unit-sphere or cardioid polar response or a look up table that defines an arbitrary directivity;
   an orientation of the sound, including an orientation per channel of audio data;
   a sound pressure level (SPL) or a sound power level of the sound, including a distance at which the SPL or sound power level was captured;
   a size or shape of the sound expressed as a polygonal mesh or a volumetric size; and
   a playback rate for the sound, including a global playback rate for all channels of the audio data.

13. The memory of claim 1 wherein the asset metadata is editable for describing how the audio asset was used in the SR application.

14. The memory of claim 13 wherein the asset metadata comprises an identification of the SR object to which the audio asset was attached.

15. The memory of claim 1 wherein the relationship parameter in the asset metadata represents any one of a location and orientation of the listener relative to the SR object as determined in the SR environment.

16. The memory of claim 15 wherein the dynamic transformation of the asset metadata is based on a characteristic of a further SR object in the SR application, wherein the characteristic of the further SR object includes any one of a location of the further SR object, an orientation of the further SR object, or a velocity of the further SR object.

17. The memory of claim 1 wherein the asset metadata comprises a description of a digital filter to be applied to the audio data.

18. The memory of claim 1 wherein the asset metadata includes a further parameter that is editable to enable dynamic transformation of the asset metadata in the SR application to alter how the audio asset is rendered, wherein the further parameter sets one of:
   an audio level of an audio signal in the audio asset;
   equalization filtering or spectral shaping of the audio signal; and
   distance compensation of the audio signal to achieve a response due to atmospheric or other sound transmission losses.

19. A memory comprising:
   a data structure stored in the memory, the data structure including an audio asset, wherein the audio asset comprises audio data and asset metadata, the audio data having therein a sound encoded in accordance with or as specified in the asset metadata, the asset metadata configures a simulated reality, SR, application to be executed by a computer for composing sound for an SR environment, as the audio asset is rendered in the SR application;

the asset metadata includes a relationship parameter representing a relationship between a listener in the SR environment and a SR object to which the audio asset is attached, the relationship parameter being editable to enable dynamic transformation of the asset metadata in the SR application which alters how the audio asset is rendered in the SR application; and an SR developer platform stored in the memory and configured to retrieve the audio asset and perform a composition using an audio asset process that enables an SR developer to export the audio asset to the SR application.

20. The memory claim 19 wherein the SR developer platform comprises a preview sound process that retrieves the audio asset and enables the SR developer to preview how an SR listener would experience sound produced from the audio asset using the asset metadata.

21. The memory of claim 19 wherein the SR developer platform comprises a compose process that facilitates editing the audio asset by i) applying a digital filter to sound generated from decoding the audio data thereby producing filtered sound, and then ii) re-encoding the filtered sound into the audio asset.

22. The memory of claim 19 wherein the SR developer platform comprises a compose process that facilitates editing the audio asset by modifying the asset metadata to describe a digital filter that is to be applied to sound generated from decoding the audio data.

23. The memory of claim 19 wherein the SR developer platform comprises a compose process that facilitates editing the audio asset by editing the asset metadata through one or more of:

appending additional metadata, scaling up the asset metadata, and changing a location of the sound that is described in the asset metadata.

* * * * *